United States Patent [19]

Sugihara

[11] Patent Number: 4,458,111
[45] Date of Patent: Jul. 3, 1984

[54] CHARGING AND DISCHARGING CIRCUIT

[75] Inventor: Mayumi Sugihara, Funabashi, Japan

[73] Assignee: Tandy Corporation, Fort Worth, Tex.

[21] Appl. No.: 341,242

[22] Filed: Jan. 21, 1982

[30] Foreign Application Priority Data

Jan. 23, 1981 [JP] Japan .......................... 56-008103[U]

[51] Int. Cl.³ .............................................. H04M 1/02
[52] U.S. Cl. .............................. 179/2 BC; 179/2 EA
[58] Field of Search .................. 179/2 BC, 2 E, 2 EA; 320/2, 8, 28, 47, 53–55

[56] References Cited

U.S. PATENT DOCUMENTS 3,476,882 11/1969 Vogelman et al. .............. 179/2 EA
3,535,689 10/1970 Oden ........................... 179/2 EA X

FOREIGN PATENT DOCUMENTS 1548145 7/1979 United Kingdom ............. 179/2 EA

Primary Examiner—G. Z. Rubinson
Assistant Examiner—W. J. Brady
Attorney, Agent, or Firm—Gary V. Pack

[57] ABSTRACT

A charge-discharge switching circuit for use in a cordless telephone which automatically connects and disconnects the receiver and transmitter circuits from a rechargeable storage battery in the handset in response to the base unit charger signal so that the transmitter and receiver circuits are disconnected from the storage battery when it is being charged by the charger in the base unit of the cordless telephone.

3 Claims, 1 Drawing Figure

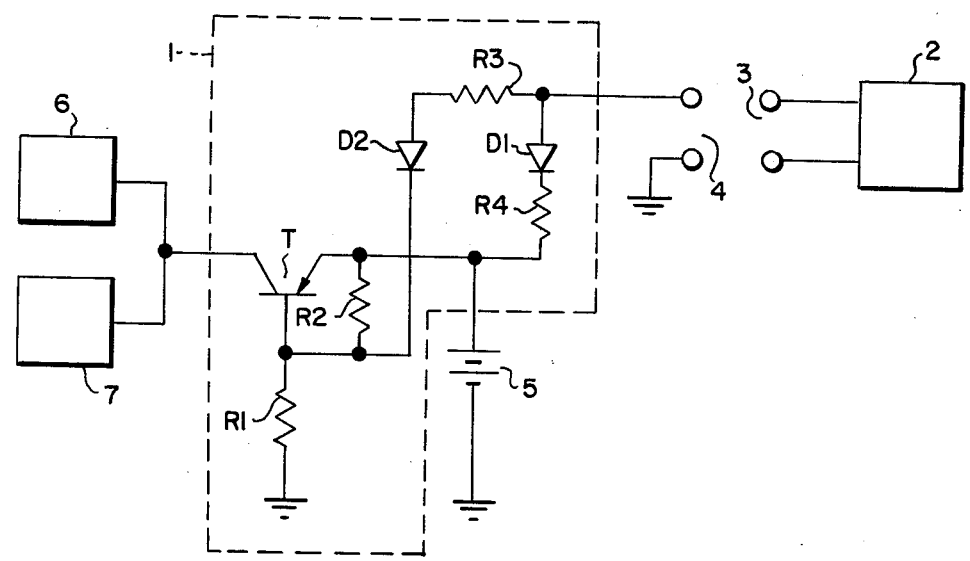

4,458,111

CHARGING AND DISCHARGING CIRCUIT

DETAILED DESCRIPTION OF THE INVENTION

This invention relates to charge-discharge switching circuits for controlling the charge and discharge on a storage battery and more particularly to charge-discharge switching circuits which are adapted to be used for a power supply storage battery in cordless telephone handsets.

Generally, cordless telephones comprise a base unit and a handset which can be removably attached thereto. The base unit comprises telephone circuitry connected to the telephone line and a transmitter/receiver for wireless communication with the handset. The handset is provided with a corresponding transmitter/receiver for wireless communication with the transmitter/receiver of the base unit, a microphone and a speaker. Since the base unit and the handset are wirelessly interconnected, the handset transmitter/receiver is provided with a separate power source which is normally a rechargeable storage battery. The base unit is provided with a charger for charging the storage battery. In cordless telephones of the above arrangement, the handset storage battery consumes as it supplies power to the handset transmitter/receiver while someone is talking. Preferably, therefore, the storage battery is charged by the charger in the base unit while not in use for talking so that enough power can be supplied whenever the telephone is being used.

Accordingly, it is an object of the present invention to provide a charge-discharge switching circuit which automatically switches the charge and discharge on a rechargeable storage battery provided in a handset according to the position of the handset with respect to the base unit, i.e., whether it is on or off the base unit.

BRIEF DESCRIPTION OF THE DRAWING

The accompanying drawing is a circuit diagram of a handset comprising a charge-discharge switching circuit of the present invention and of a charger provided in a base unit.

An embodiment of the present invention is illustrated in the accompanying drawing which is a circuit diagram of a handset comprising a charge-discharge switching circuit of the present invention and of a charger provided in a base unit.

Referring now to the drawing, there are an electrical circuit 1 of a handset and a charger 2 mounted in a base unit. The two output terminals of the charger 2 are connected to a pair of charging electrodes 3, respectively, which are provided on the base unit. The handset is provided with a corresponding pair of charging electrodes 4 which make contact with the pair of charging electrodes 3, respectively, when the handset is placed on the base unit. The handset circuitry comprises a charge-discharge switching circuit 1 connected to the pair of charging electrodes 4, a nickel-cadmium (NI-CD) storage battery 5 connected to the circuit 1, a transmitter 6, and a receiver 7. The charge-discharge switching circuit 1 operates to connect the nickel-cadmium storage battery to the transmitter 6 and the receiver 7 or to the charger 2 in response to the presence or absence of a potential across the pair of charging electrodes 4.

As illustrated in the drawing, the detailed arrangement of the circuit 1 comprises a PNP transistor T and diodes D1 and D2. The transistor T has a collector connected to the transmitter 6 and the receiver 7, a base connected to ground through a resistor R1, and an emitter connected to the positive side of the nickel-cadmium storage battery 5. The base is connected to the emitter through a resistor R2. The base is also connected to one of the pair of charging electrodes 4 through the diode D2 and a resistor R3. The emitter is also connected to the cathode of the diode D1 through a resistor R4. The anode of the diode D1 is connected to said one of the pair of charging electrodes 4. The other of the pair of charging electrodes 4 is connected to ground.

In operation of the circuit 1 of the above arrangement, the pairs of charging electrodes 3 and 4 are not in contact with each other while someone is talking, where the handset is off the base unit, and the output voltage from the charger 2 is not applied across the electrodes 4, during which time current from the storage battery 5 flows through the resistors R1 and R2 and the transistor T but not through the resistors R3 and R4. The resistance values of the resistors R1 and R2 are preset so that the emitter-base is biased in the forward direction when current flows therethrough, whereby the transistor T conducts. When the transistor T is in the conductive state, the storage battery 5 supplies electrical power to the transmitter 6 and the receiver 7, whereupon the handset is ready to operate wireless communication with the base unit, whereby talking is made possible whenever required. In the circuit shown, the storage battery 5 is protected by the diodes D1 and D2 against shorting even if the pair of electrodes 4 are short-circuited while talking.

On the other hand, while the handset is not in use and is on the base unit, the pairs of electrodes 3 and 4 are in contact with each other, whereby the charging voltage from the charger 2 is applied across the electrodes 4, during which time current from the charger 2 flows through the diode D1 and the resistor R4 and into the storage battery 5. At the same time, current also flows through the diode D2 and the resistor R3 to the resistor R1 which is connected to the base. The resistors R1 and R3 have preset resistance values so that the emitter-base is biased in the reverse direction by increase in voltage drop across the resistor R1 when current flows therethrough, whereby the transistor T does not conduct. When the transistor T is in the nonconductive state, the power supply to the transmitter 6 and the receiver 7 from the storage battery 5 stops. Thus, the storage battery 5 starts to be charged by the charger 2.

As described above, the employment of the charge-discharge switching circuit of the present invention assures that the handset storage battery can be charged while the telephone is not in use and the handset transmitter/receiver can be automatically supplied with power for wireless communication while the handset is off the base unit for talking.

It should be understood that the present charge-discharge switching circuit may be attained by any arrangement which can connect the storage battery 5 to the charging electrodes 4 or the transmitter 6 and the receiver 7 in response to the presence or absence of a potential applied across the electrodes 4, and is not limited to the detailed circuit shown.

I claim:

1. A charge-discharge switching circuit for use in a cordless telephone including a base unit and a handset, wherein the base unit comprises a charger having an output and a pair of first charging electrodes respectively connected to said output, and wherein the handset is removably mounted to the base unit and has a transmitter/receiver for wireless communicating with the base unit, a rechargeable storage battery, and a pair of second charging electrodes which are brought into contact with the pair of first charging electrodes respectively when the handset is placed on the base unit, characterized in that the charge-discharge switching circuit is provided in the handset, said circuit being operative in response to the output signal of the charger to separate the battery from the transmitter/receiver for charging the storage battery when the handset is placed on the base unit and to connect the storage battery to the transmitter/receiver for supplying electrical power for the transmitter/receiver when the handset is separated from the base unit.

2. The invention recited in claim 1, wherein the charge-discharge switching circuit comprises voltage responsive switching means connected between the transmitter/receiver and the rechargeable storage battery so that upon detection of output signal voltage from the charger, the transmitter/receiver is disconnected from the rechargeable storage battery until said output signal voltage is discontinued.

3. The invention recited in claim 2, further characterized in that the voltage responsive switching means includes a voltage divider circuit and a transistor circuit connected so that when the output signal voltage from the charger is above a predetermined level, the transistor is commutated off, thereby disconnecting the transmitter/receiver from the rechargeable storage battery, and when the output signal voltage is below a said predetermined level, the transistor is commutated on by the charge from the rechargeable storage battery, thereby turning on the transmitter/receiver.

* * * * *